June 24, 1941.  E. L. DRAKE  2,246,624
CONVEYER
Filed Jan. 9, 1940  2 Sheets-Sheet 1
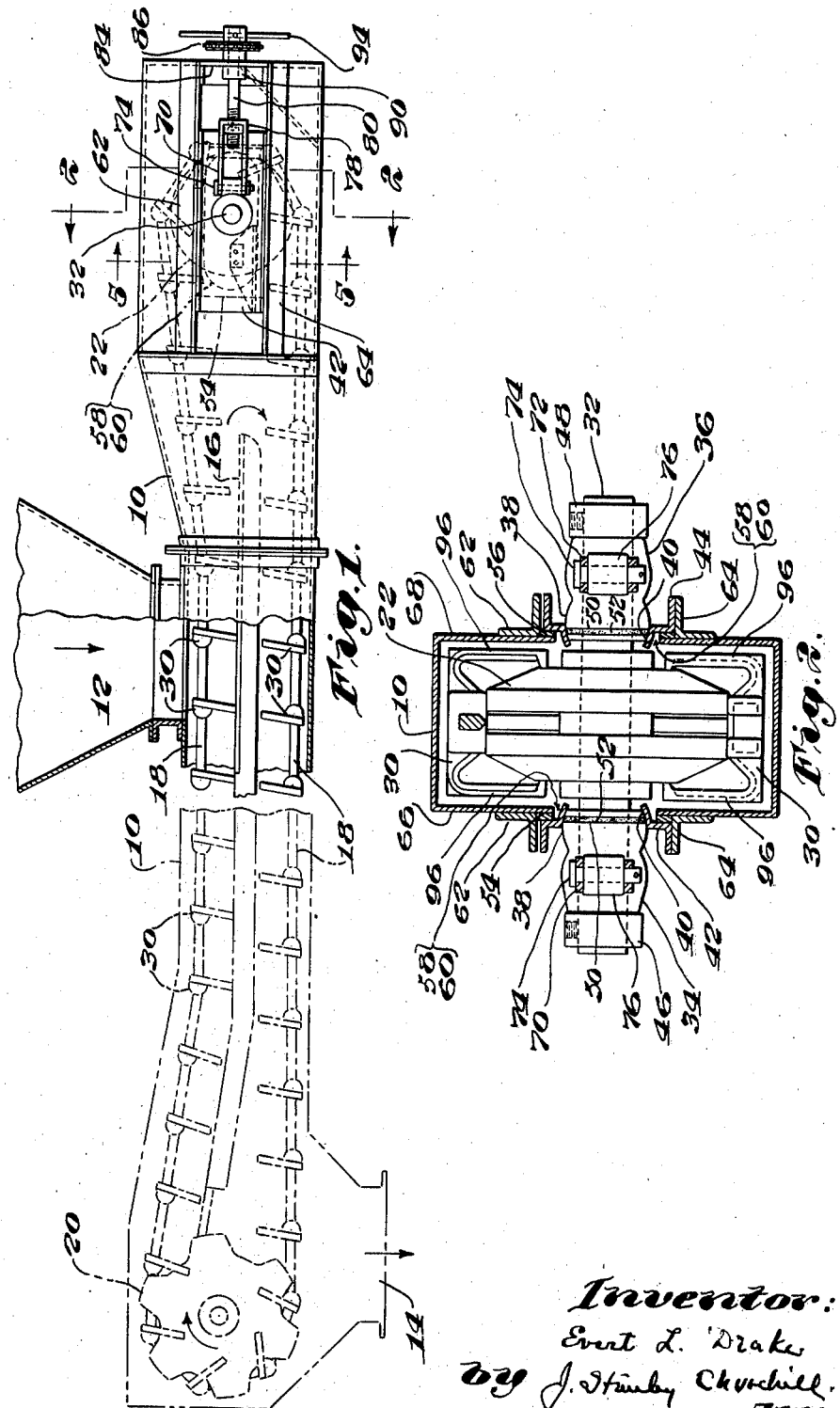
Inventor:
Evert L. Drake
by J. Stanley Churchill.
Atty.

June 24, 1941.  E. L. DRAKE  2,246,624
CONVEYER
Filed Jan. 9, 1940  2 Sheets-Sheet 2
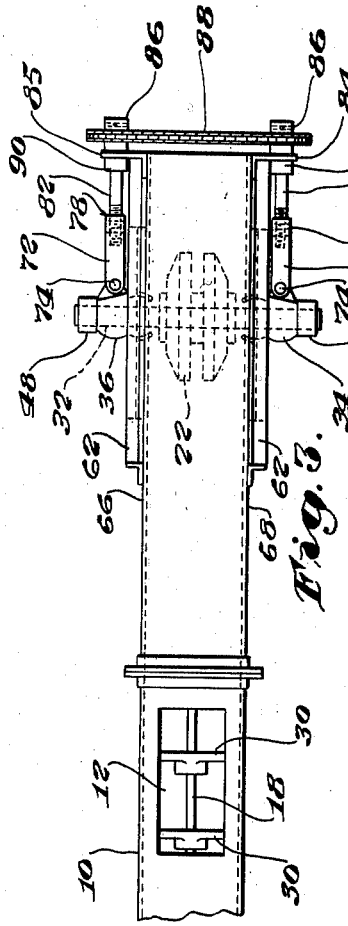
Inventor:
Everett L. Drake
by J. Stanley Churchill
Att'y Patented June 24, 1941

2,246,624

UNITED STATES PATENT OFFICE 2,246,624

CONVEYER

Evert L. Drake, Aurora, Ill., assignor to Redler Conveyor Company, Quincy, Mass., a corporation of Massachusetts Application January 9, 1940, Serial No. 313,073

10 Claims. (Cl. 198—208)

This invention relates to a conveyer.

The invention has for an object to provide an improved conveyer of the type provided with an endless conveying element and a rotary member over which the conveying element passes and in which a bearing unit of novel and improved construction is provided for the rotary member, having provision for adjustment longitudinally of the conveyer and whose construction is such as to enable the bearing unit to move with respect to its supporting element to the end that the bearing members may maintain their alignment with respect to the shaft journaled therein irrespective of any disalignment of the supporting elements.

A further object of the invention is to provide an improved conveyer of the character specified in which the rotary member and the endless conveying element are disposed within a casing through which the conveying element is drawn to effect the conveyance of material therethrough which is provided with an adjustable bearing unit for the rotary member and which is further characterized by having a substantially dust tight joint between the bearing members and their supporting elements adjacent sides of the casing.

A still further object of the invention is to provide a novel and improved conveyer of the character described having an upper run and a lower run and in which provision is made for preventing the conveying element from following the rotary member after it has passed thereover at the idler end of the conveyer and to cause the conveying element to leave the rotary element at the proper time and continue along the lower run.

With these general objects in view, and such others as may hereinafter appear, the invention consists in the improved conveyer and in the various structures, arrangements and combinations of parts hereinafter described and particularly defined in the claims at the end of this specification.

In the drawings illustrating the preferred embodiment of the invention, Fig. 1 is a side elevation, with portions broken away, of a conveyer embodying the present invention, one end of the conveyer being shown in broken lines; Fig. 2 is an enlarged cross-sectional view on the line 2—2 of Fig. 1, illustrating the adjustable bearing; Fig. 3 is a plan view of the end of the conveyer shown in full lines in Fig. 1; Fig. 4 is an end view of the portion of the conveyer shown in Fig. 3; and Fig. 5 is a cross-section on the line 5—5 of Fig. 1 illustrating a detail to be referred to.

In general, the present invention is preferably embodied in a conveyer of the type particularly adapted for the conveyance of flowable solid material comprising an endless conveying element arranged to be drawn through a casing or trough to effect the conveyance of the material therethrough and in which the conveying element is arranged to pass over one or more rotary elements, and preferably two as illustrated herein, disposed at opposite ends of the casing. One of the rotary elements may comprise a sprocket which may be driven through any usual or preferred driving mechanism and the other rotary element may comprise an idler member. The present invention contemplates a novel and improved construction of an adjustable bearing unit which may be used with advantage as a mounting for the idler member and which is arranged to be moved longitudinally of the casing to take up the slack in the conveying element for efficient operation, or to slacken the conveying element for the purpose of making repairs or adjustments thereto and for facilitating assembly thereof.

Prior to the present invention, in those conveyers of the present type of which I am aware, the bearing members for the idle wheel were fixed to movable plates mounted adjacent the sides of the conveyer casing, each bearing being arranged to be individually adjusted. In such prior structures, extreme care was required in the adjustment of one bearing with relation to the other since if one bearing became out of alignment with the other, even to an extent of only a few thousandths of an inch, the shaft would bind in the bearings and stop the driving motor. In accordance with the present invention, the bearing unit is constructed and arranged in a manner such as to permit the bearings to move with relation to their supporting plates in a manner analogous to the movement of the members of a ball and socket joint while maintaining the alignment of both bearings with relation to the shaft, so that if one bearing is inadvertently advanced or retracted slightly more than the other during adjustment, no harm will result since the bearings are enabled to rock in their supports to maintain their alignment with the shaft. Provision is also made in the present bearing structure for producing a substantially dust tight joint between the bearing members and their supporting plates to the end that leakage of the material being conveyed may be reduced to a minimum.

Referring now to the drawings, the different features of the invention have, for purposes of illustration, been shown as embodied in a conveyer of the general type illustrated in the United States patent to Sinden, No. 2,154,707, April 18, 1939, and in which 10 represents the casing which is provided with an inlet 12 and an outlet 14. In operation, the flowable solid material is introduced into the casing through the inlet 12 and in the conveyer illustrated in Fig. 1, the material is conveyed to the right through the upper run of the casing and over a deflecting or supporting plate 16 by an endless conveying element indicated generally by the numeral 18.

In the illustrated embodiment of the invention, the conveying element 18 is arranged to run around a driven sprocket 20 disposed at one end of the conveyer, and an idler wheel 22 disposed at the other end of the conveyer. The sprocket 20 may be driven from any convenient source of power, not shown. The material is then permitted to fall by gravity from the supporting plate 16 onto the bottom wall of the casing 10 where it is conveyed to the outlet 14 by the lower run of the conveyer. In the preferred embodiment of the invention, the conveying element 18 may comprise a plurality of pivotally and detachably connected flight members 30 of open construction and of general U-shape which are disposed transversely of the casing in order to effect the conveyance of the material therethrough. It will be understood that the above described conveyer is merely illustrative of one form of the invention and that it may be embodied in conveyers of different forms.

Referring now particularly to Fig. 2, provision is made for adjustably supporting the idler wheel 22 in the casing 10. As herein shown, the wheel 22 is mounted upon a shaft 32 which is rotatably mounted in bearing members 34, 36, disposed upon either side of the casing 10. The inner end of each bearing is spherically formed as at 38 and is adapted to fit into similarly formed indentations or openings 40 provided in slide plates 42, 44. Collars 46, 48 are provided at each end of the shaft 32 to retain the bearings in their assembled position and in contiguous engagement with the spherically formed openings 40. Each bearing, near its inner edge adjacent the sides of the casing, is provided with a grooved portion 50 into which is inserted a ring of felt 52 or similar material in order to provide a substantially dust proof fit between the bearings 34, 36 and the slide plates 42, 44.

In the preferred embodiment of the invention, the slide plates 42, 44 are retained in sliding engagement with cover plates 54, 56 respectively by the pressure of the bearings against the openings 40. The cover plates are secured to the opposite sides of the casing 10 and are provided with elongated openings 58 to provide clearance for the bearings and their mountings when they are adjusted longitudinally of the casing, as will be described. Similar openings 60 are provided in the sides of the casing 10.

The slide plates 42, 44 are preferably guided longitudinally between angle members 62, 64 secured to the side walls 66, 68 of the casing 10. In operation, each slide plate is in contiguous engagement with its respective cover plate and is arranged to keep the opening therein closed at all times within the limits of adjustment.

Provision is made for adjusting the idler wheel unit longitudinally of the casing, and as herein illustrated, the adjusting mechanism may comprise connections to each bearing member 34, 36 including yoke members 70, 72 connected to the bearings by pins 74 which project through lugs 76 extending from the bearings. The yoke members 70, 72 are provided at their outer end with threaded portions 78 in which are received adjusting screws 80, 82. As herein shown, the adjusting screws are rotatably mounted in angle brackets 84, 85 which latter are secured to opposite sides 66, 68 of the casing 10 and at its extreme end. Each adjusting screw 80, 82 is provided with a sprocket 86 fast thereon and the sprockets are connected together by a chain 88 in order to enable simultaneous adjustment of the bearing members 34, 36. The sprockets 86 are arranged to bear against one side of their respective supporting brackets 84, 85 and each screw 80, 82 is provided with a collar 90 arranged to bear against the opposite side of the brackets in order to prevent axial movement of the adjusting screws 80, 82. Provision is made for rotating the adjusting screws, and as herein shown, each sprocket is provided with a plurality of openings 92 extending through each hub, which are arranged to receive an adjusting rod 94 for manually rotating either screw. In operation, when the screws are rotated in a clockwise direction, the threaded yoke members 70, 72 are drawn to the right, viewing Fig. 1, to effect a tightening of the conveying element 18. Conversely, when the screws are turned counterclockwise, the bearing unit is urged away from the idler end of the conveyer to slacken the conveying element.

From the description thus far, it will be observed that any slight variation in the adjustment of the opposed bearing members 34, 36, which may be due to the play between the various operating parts, will not result in binding the idler wheel shaft 32 since the spherically formed ends 38, of the bearings 34, 36 enable the latter to rock with respect to the slide plates 42, 44 in order to maintain their alignment with the shaft 32 and to assure smooth and efficient operation of the conveyer. Thus, the operation of adjusting the bearing unit is greatly facilitated and rendered practically foolproof so that no damage will result if one bearing is inadvertently advanced or retracted slightly more than the other. Although the chain 88 as herein shown is provided for convenience in simultaneously adjusting both bearings, it will be apparent that the chain may be dispensed with and each bearing adjusted individually if desired.

Referring now to Figs. 1 and 5, it will be observed that the idler wheel 22 is designed to engage the ends of the legs 96 of each U-shaped link 30 of the conveying element in order to guide and align the latter with respect to the casing as it passes thereover. In practice, it was found that, in some instances, particularly when running hydrated or sticky materials, the links 30 would have a tendency to continue in engagement with the idler wheel, for a short distance after having passed under the wheel. That is, instead of leaving the wheel gently and continuing along the lower run, the flights would be carried upwardly for a short distance and then would snap down into the lower run, causing considerable noise and interfering generally with the smooth running operation of the conveyer. In order to assure that the flights 30 leave the wheel at the proper time, provision is made for preventing the flights from being carried upwardly after passing over the idler end of the conveyer. As herein shown, see Fig. 5, a pair of guide members 100, 102 are provided, which are secured to the inner surfaces of the slide plates 40, 42 respectively, by filling pieces 104, 106. Each guide member is provided with an inwardly extended leg 108 arranged to engage the ends of the legs 96 as they pass under the idler wheel 22 to cause the flights to leave the wheel and continue along the lower run of the conveyer. It will be observed that the guide members 100, 102 are elongated longitudinally of the casing 10 sufficiently to permit them to be moved with the adjusting mechanism without effectively disturbing the relationship between the flights and the horizontally extended legs 108 of the guide members during the operation of the conveyer.

While the invention has been herein illustrated and described as embodied in a conveyer of the type particularly adapted for the conveyance of flowable solid material in a continuous stream, it will be understood that the invention may be embodied in other forms of conveyers or elevators within the scope of the following claims.

Having thus described the invention, what is claimed is:

1. In a conveyer, in combination, a casing provided with longitudinal openings in its sides, an endless conveying element, a rotary member over which said conveying element passes, a shaft upon which said rotary member is mounted, a bearing unit for said shaft comprising a pair of opposed bearing members spaced apart, means in sliding engagement with opposite sides of said casing for supporting said bearing unit, said supporting means being arranged to cover said longitudinal openings in said casing sides, said bearing members having surfaces in engagement with said supporting means shaped to permit movement of said bearing unit with respect to said supporting means to enable said bearing members to maintain their alignment with said shaft irrespective of disalignment of said supporting means, said bearing members being arranged to maintain said supporting means in substantially dust tight relation to said casing.

2. In a conveyer, in combination, a casing provided with longitudinal openings in its sides, an endless conveying element, a rotary member over which said conveying element passes, a shaft upon which said rotary member is mounted, a bearing unit for said shaft comprising a pair of opposed bearing members spaced apart and having their adjacent ends curved, and means in sliding engagement with opposite sides of said casing for supporting said bearing unit, said supporting means being arranged to cover said longitudinal openings in said casing sides, said supporting means having curved indentations adapted to receive said curved bearing ends, said bearing unit being capable of rocking movement with respect to said supporting means whereby to enable said bearing members to maintain their alignment with respect to said shaft irrespective of disalignment of said supporting means, said bearing members being arranged to maintain said supporting means in substantially dust tight engagement with the sides of said casing.

3. In a conveyer, in combination, a casing provided with longitudinal openings in its sides, an endless conveying element, a rotary member over which said conveying element passes, a shaft upon which said rotary member is mounted, a bearing unit for said shaft comprising a pair of opposed bearing members spaced apart, means in sliding engagement with opposite sides of said casing for adjustably supporting said bearing unit, said supporting means being arranged to cover said longitudinal openings in said casing sides, said bearing members having surfaces in engagement with said supporting means shaped to permit movement of said bearing unit with respect to said supporting means to enable said bearing members to maintain their alignment with said shaft irrespective of disalignment of said supporting means, said bearing members being arranged to maintain said supporting means in substantially dust tight engagement with the sides of said casing.

4. In a conveyer, in combination, a casing provided with longitudinal openings in its sides, an endless conveying element, a rotary member over which said conveying element passes, a shaft upon which said rotary member is mounted, a bearing unit for said shaft comprising a pair of opposed bearing members spaced apart and having their adjacent ends curved, and means in sliding engagement with opposite sides of said casing for adjustably supporting said bearing unit including a pair of longitudinally movable slide plates having curved indentations adapted to receive said curved bearing ends, said side plates being arranged to cover said longitudinal openings in said casing sides, said bearing unit being capable of rocking movement with respect to said longitudinally movable slide plates whereby to enable said bearing members to maintain their alignment with respect to said shaft irrespective of disalignment of said adjustable supporting means, said bearing members being arranged to maintain said supporting means in substantially dust tight engagement with the sides of said casing.

5. In a conveyer of the character described, in combination, a casing, provided with longitudinal openings in its sides, an endless conveying element traversable through the casing, a rotary member over which said conveying element passes, a shaft upon which rotary member is mounted, a bearing unit for said shaft comprising a pair of opposed bearing members spaced apart and having their adjacent ends spherically formed, means in sliding engagement with opposite sides of said casing for adjustably supporting said bearing unit including a pair of longitudinally movable slide plates having spherically shaped indentations adapted to receive said spherically formed ends, said slide plates being arranged to cover said longitudinal openings in said casing sides, guide means for said plates carried by said casing, and means for maintaining said bearing members in contiguous engagement with said slide plates, said bearing unit being capable of rocking movement with respect to said adjustable supporting means whereby to enable said bearing members to maintain their alignment with respect to said shaft irrespective of disalignment of said adjustable supporting means, said bearing members being arranged to maintain said slide plates in substantially dust tight relation to said casing.

6. In a conveyer of the character described, in combination, a casing, provided with longitudinal openings in its sides, an endless conveying element traversable through the casing, a rotary member over which said conveying element passes, a shaft upon which said rotary member is mounted, a bearing unit for said shaft comprising a pair of opposed bearing members spaced apart and having their adjacent ends spherically formed, means in sliding engagement with opposite sides of said casing for adjustably supporting said bearing unit including a pair of longitudinally movable slide plates having spherically shaped indentations adapted to receive said spherically formed ends, said slide plates being arranged to cover said longitudinal openings in said casing sides, guide means for said plates carried by said casing, means for maintaining said bearing members in contiguous engagement with said slide plates, and means for adjusting said bearing unit longitudinally of said casing including a pair of adjusting rods operatively connected to said bearing members, said bearing unit being capable of rocking movement with respect to said adjustable supporting means whereby to enable said bearing members to maintain their alignment with respect to said shaft irrespective of disalignment of said supporting means, said bearing members being arranged to maintain said slide plates in substantially dust tight relation to said casing.

7. In a conveyer of the character described, in combination, a casing provided with longitudinal openings in its sides, an endless conveying element traversable through the casing, a rotary member over which said conveying element passes, a shaft upon which said rotary member is mounted, a bearing unit for said shaft comprising a pair of opposed bearing members spaced apart and having their adjacent ends spherically formed, means in sliding engagement with opposite sides of said casing for adjustably supporting said bearing unit including a pair of longitudinally movable slide plates having spherically formed ends, said slide plates being arranged to cover said longitudinal openings in said casing sides, guide means for said plates carried by said casing, means for maintaining said bearing members in contiguous engagement with said slide plates, and means for adjusting said bearing unit longitudinally of said casing including a pair of adjusting rods operatively connected to said bearing members, and means for simultaneously rotating said adjusting rods, said bearing unit being capable of rocking movement with respect to said adjustable supporting means whereby to enable said bearing members to maintain their alignment with respect to said shaft irrespective of disalignment of said supporting means, said bearing members being arranged to maintain said slide plates in substantially dust tight relation to said casing.

8. In a conveyer of the character described, in combination, a casing provided with longitudinal openings in its sides, an endless conveying element traversable through the casing, a pair of rotary members disposed at opposite ends of the conveyer around which said conveying element passes, one of said rotary members comprising an idler wheel, a shaft upon which said idler wheel is mounted, a bearing unit for said shaft comprising a pair of opposed bearing members spaced apart and having the hubs of their adjacent ends spherically formed, means in sliding engagement with opposite sides of said casing for adjustably supporting said bearing unit including a pair of longitudinally movable slide plates having spherically formed indentations adapted to receive said spherically formed ends, said slide plates being arranged to cover said longitudinal openings in said casing sides, guide means for said plates carried by said casing, a pair of collars on said shaft arranged to maintain said bearing members in assembled relation with said slide plates, and means for adjusting said bearing unit longitudinally of said casing, said bearing unit being capable of rocking movement with respect to said adjustable supporting plates whereby to enable said bearing members to maintain their alignment with respect to said shaft irrespective of disalignment of said slide plates, said bearing members being arranged to maintain said slide plates in substantially dust tight relation to said casing.

9. In a conveyer, in combination, a casing provided with longitudinal openings in its sides, an endless conveying element, a rotary member over which said conveying element passes, a shaft upon which said rotary member is mounted, a bearing unit for said shaft comprising a pair of opposed bearing members spaced apart and having their adjacent ends curved, means in sliding engagement with opposite sides of said casing for adjustably supporting said bearing unit including a pair of longitudinally movable slide plates having curved indentations adapted to receive said curved bearing ends, said slide plates being arranged to cover said longitudinal openings in said casing sides, guide means for said plates carried by said casing, means for maintaining said bearing members in contiguous engagement with said slide plates, said bearing members being provided with grooved portions, sealing strips in said grooved portions arranged to form a dust tight joint between said bearings and said slide plates, said bearing unit being capable of rocking movement with respect to said longitudinally movable slide plates whereby to enable said bearing members to maintain their alignment with respect to said shaft irrespective of disalignment of said supporting means, said bearing members being arranged to maintain said slide plates in substantially dust tight relation to said casing.

10. In a conveyer, in combination, a casing having an upper and a lower run, an endless conveying element traversable through the casing comprising a plurality of U-shaped open flights pivotally and detachably connected together, a rotary member around which said conveying element passes, an adjustable bearing unit for said rotary member including a pair of longitudinally movable supporting plates, and means for guiding said conveying element into the lower run of the conveyer after it has passed around said rotary member comprising a pair of guide members secured to said supporting plates and movable therewith, said guide members having surfaces arranged to engage the extended legs of said U-shaped flights.

EVERT L. DRAKE.